(12) United States Patent
Urrutia (10) Patent No.: US 9,282,694 B2
(45) Date of Patent: Mar. 15, 2016

(54) ARTICULATED GARDEN RAKE

(71) Applicant: INCOUR INNOVATIONS LTD., Maple (CA)

(72) Inventor: Cesar Urrutia, Maple (CA)

(73) Assignee: INCOUR INNOVATIONS LTD., Maple, Ontario (CA)

( * ) Notice: Subject to any disclaimer, the term of this patent is extended or adjusted under 35 U.S.C. 154(b) by 15 days.

(21) Appl. No.: 14/258,907

(22) Filed: Apr. 22, 2014

(65) Prior Publication Data

US 2015/0296705 A1  Oct. 22, 2015

(51) Int. Cl.
*A01D 7/00* (2006.01)
*A01D 7/10* (2006.01)
*A01D 7/04* (2006.01)

(52) U.S. Cl.
CPC ... *A01D 7/10* (2013.01); *A01D 7/04* (2013.01)

(58) Field of Classification Search
CPC ............. A01D 7/00; A01D 7/04; A01D 7/10; A01D 7/02; A01D 7/06; A63B 57/0068; A63B 2210/50; A63B 47/02; A01B 1/222; A01G 1/12
USPC ............... 56/400.19, 400.04, 400.18, 400.01; 294/50.8; D15/11
See application file for complete search history.

(56) References Cited

U.S. PATENT DOCUMENTS

| | | | | |
|---|---|---|---|---|
| 678,519 A * | 7/1901 | Robinson | ............... | A01B 1/222 172/373 |
| 1,740,286 A * | 12/1929 | Dabrowski | ............... | A01D 7/04 172/378 |
| 2,840,978 A * | 7/1958 | Spinosa | ................... | A01D 7/02 56/400.04 |
| 2,902,815 A | 9/1959 | Gallo, Sr. | | |
| 3,390,516 A * | 7/1968 | Burrows | .................. | A01D 7/00 56/400.19 |
| 4,086,750 A * | 5/1978 | White | ....................... | A01D 7/00 56/400.18 |
| 4,216,831 A * | 8/1980 | Ritchie | .............. | A63B 57/0068 172/380 |
| 5,414,982 A | 5/1995 | Darnell | | |
| 5,440,868 A | 8/1995 | Darnell | | |
| 5,609,215 A * | 3/1997 | Rios | ......................... | A01B 1/20 172/373 |
| 5,927,058 A | 7/1999 | Hsu | | |
| 6,058,691 A * | 5/2000 | Greeves | ............. | A63B 57/0068 56/400.04 |
| 6,101,799 A | 8/2000 | Darnell | | |
| 6,283,521 B1 | 9/2001 | Agrati | | |
| 2002/0174641 A1 * | 11/2002 | Biggs | ........................ | A01D 7/06 56/400.12 |
| 2006/0168935 A1 * | 8/2006 | Sanders | .................. | A01D 7/00 56/400.16 |
| 2010/0127521 A1 * | 5/2010 | Thibault | .................. | A01D 7/04 294/19.2 |

FOREIGN PATENT DOCUMENTS

WO    WO 02102137 A1    12/2002

* cited by examiner

*Primary Examiner* — Árpád Fábián-Kovács
(74) *Attorney, Agent, or Firm* — Sabeta IP (57) ABSTRACT

A rake comprising a handle with an upper portion, an intermediate portion and a lower portion; a pair of oppositely disposed frames pivotally attached to said lower portion, said pair of oppositely disposed frames having a plurality of tines; an articulating mechanism comprising a pair of brackets fixedly coupled to said lower portion; a pair of rods fixedly coupled between said pair of brackets; a handle collar slidable on said handle, said handle collar coupled to a rod collar by a pair of connecting members, said rod collar slidable on one of said pair of rods; a pair of connector rods hingedly coupled between said rod collar and said pair of oppositely disposed frames; and whereby sliding said handle collar causes said rod collar to slide in sympathy and provides a force to said pair of connector rods to pivot said pair of oppositely disposed frames towards one other or away from one another.

11 Claims, 8 Drawing Sheets

ARTICULATED GARDEN RAKE

BACKGROUND OF THE INVENTION

1. Field of the Invention

The present invention relates to tools for gathering and disposing of yard debris and other similar material.

2. Description of the Related Art

There are several types of commercially available rakes that can pick up gathered debris, such as leaves, grass cuttings, thatch, flower or plant clippings, even pine needles and cones, and deposit the debris into a collection bag or a wheelbarrow. For example, rakes comprising two rake heads operable to grasp debris are well known. One such rake is a combination of two rakes with their rake heads facing each other and their handles joined scissors style at a point somewhere along their handles. The rake heads are caused to close on the debris by forcing the handles towards each other. Another type of a rake comprises two rake heads, symmetrical in structure, mutually hinged and connected to a handle. The handle supports mechanism for opening and closing the two rake heads, which comprises a pair of cables connected to the rake heads which are pulled or slackened to open and close the rake heads. Yet another rake comprises a sleeve, a first tine head secured on the sleeve, a second tine head rotatably secured on the sleeve and rotatable from an open position to a folded position, and a means for rotating the second tine head towards the first tine head at the folded position. However, these prior art rakes are complicated and difficult to use, non-ergonomic, and also have low pick-up volumes.

It is an object of the present invention to mitigate or obviate at least one of the above-mentioned disadvantages.

SUMMARY OF THE INVENTION

In one of its aspects, there is provided a rake comprising:
a handle with an upper portion, an intermediate portion and a lower portion;
a pair of oppositely disposed frames pivotally attached to said lower portion, said pair of oppositely disposed frames having a plurality of tines;
an articulating mechanism comprising:
a pair of rods fixedly coupled to said lower portion;
a handle collar slidable on said handle, said handle collar coupled to a rod collar slidable on one of said pair of rods;
a pair of connector rods hingedly coupled between said collar and said pair of oppositely disposed frames;
whereby sliding said handle collar causes said rod collar to slide in sympathy and provides a force to said pair of connector rods to pivot said pair of oppositely disposed frames towards one other or away from one another.

In another of its aspects, there is provided a method of use of a rake for gathering material in a raking mode and a picking mode, the method comprising the steps of:
pivotally mounting a first rake head and a second rake head between an upper bracket and a lower bracket, said upper bracket being coupled to a handle;
articulating said first rake head and said second rake head for axial alignment therebetween to place said rake in said raking mode;
engaging a stop mechanism associated with said upper bracket to maintain said rake in said raking mode;
disengaging said stop mechanism and articulating said first rake head and said second rake head to pivot said first rake head and said second rake head towards each other to place said rake in said picking mode.

Advantageously, the rake facilitates lifting and disposal of debris and provides an articulated frame structure having rake tines such that the articulated frame structure can be moved between an extended open position for the gathering of debris, and a pivoted position wherein the frame structure is pivoted to partially enclose the gathered debris for picking up of same.

BRIEF DESCRIPTION OF THE DRAWINGS

Several preferred embodiments of the present invention will now be described, by way of example only, with reference to the appended drawings in which.

DETAILED DESCRIPTION OF EXEMPLARY EMBODIMENTS

The detailed description of exemplary embodiments of the invention herein makes reference to the accompanying block diagrams and schematic diagrams, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way.

More particularly, in one exemplary embodiment of the invention, there is provided a pivoting rake frame comprising an elongated handle with a proximal and a distal end. An articulated frame structure having tines is attached to the distal end of the handle for articulated movement between extended-open and the enclosed positions about two axes of articulation or pivoting axis coaxial with the longitudinal axis of the handle. An articulating assembly comprising a set of two pivot brackets with two fixed rods attached to the handle at the distal end allows for the pivoting of the articulated frame structure. A stop mechanism allows the articulated frame structure to remain in an extended-open position for gathering of debris.

Figure 1:
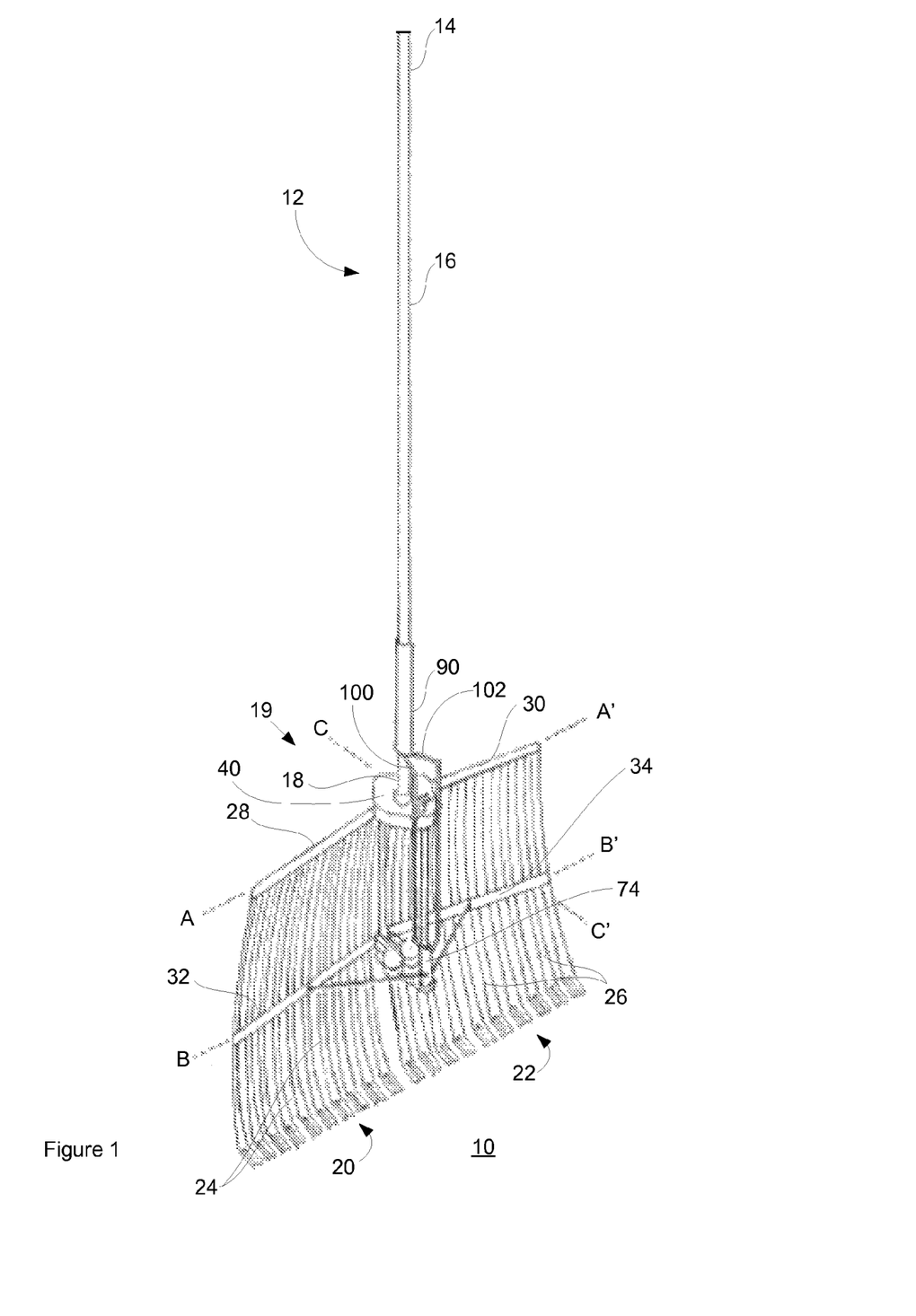
FIG. 1 shows is a perspective view of a pivoting garden rake in an extended-open position, in one exemplary embodiment.

With reference to FIG. 1, there is shown a rake, generally designated by the numeral 10, in one exemplary embodiment. The rake 10 comprises an elongate handle 12 with an upper portion 14, an intermediate portion 16 and a lower portion 18. Pivotally attached to lower portion 18 is an articulated frame structure 19 comprising a pair of oppositely disposed rake heads 20, 22 having a plurality of tines 24, 26, secured to upper arms 28, 30 and lower arms 32, 34. Tines 24, 26 are suitably dimensioned and separated for gathering yard debris, such as, leaves, grass cuttings, thatch, flower or plant clippings, even pine needles and cones. Accordingly, tines 24, 26 are equally spaced apart and have a generally curved cross section for improved strength and durability. Fixedly coupled to lower portion 18 is articulating mechanism 27 actuated to cause rake heads 20, 22 to move, thereby placing rake 10 in a raking mode for gathering debris, or a picking mode for grasping and picking up and/or transporting the debris.

Figure 2:
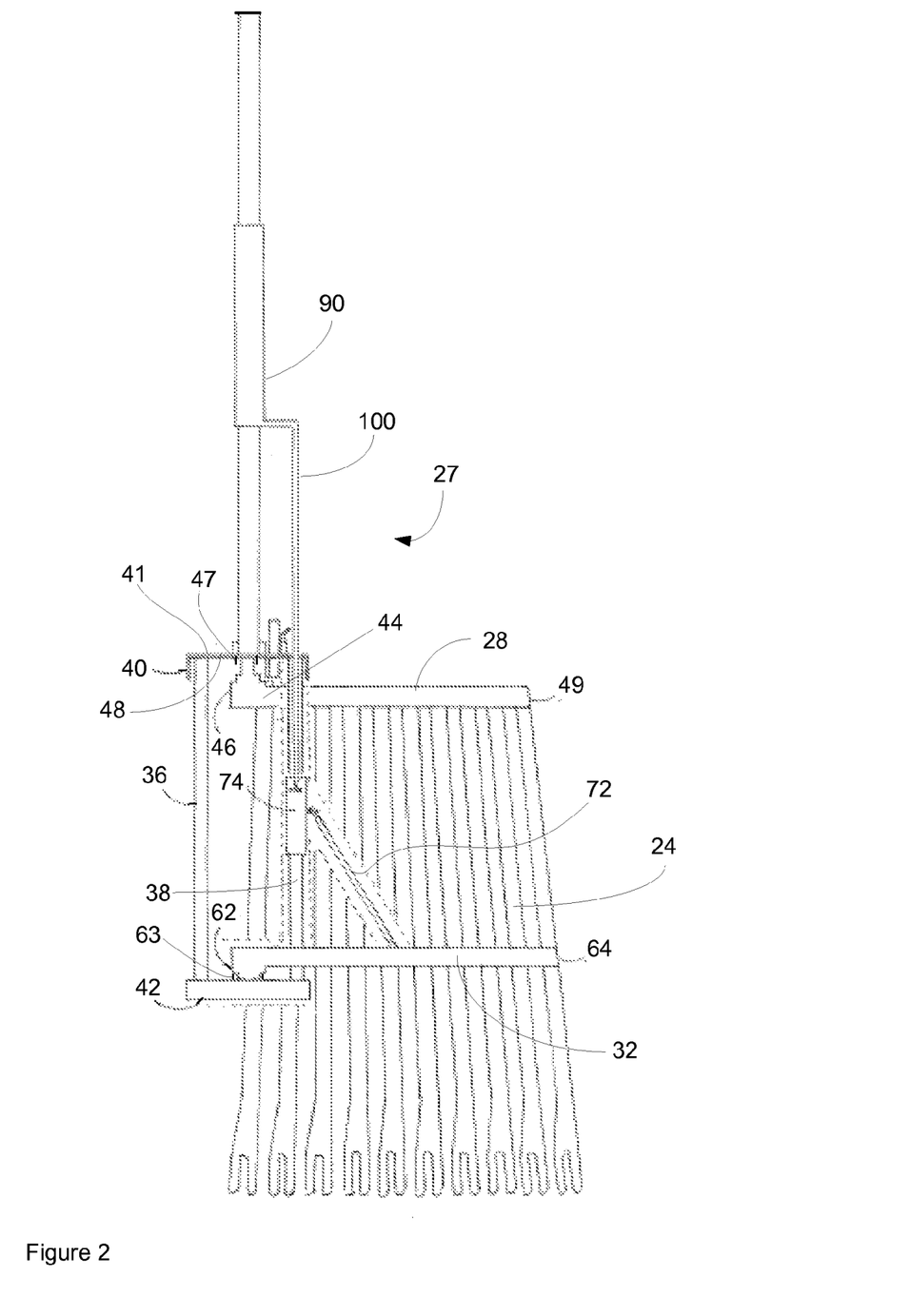
FIG. 2 is a profile view of the rake of FIG. 1 in a closed position, showing a mechanism for opening and closing an articulated frame, proximal and distal pivot brackets, front and rear fixed rods, sliding handle collar, auxiliary sliding rod collar, connecting members and connector rods and tines.
Figure 3:
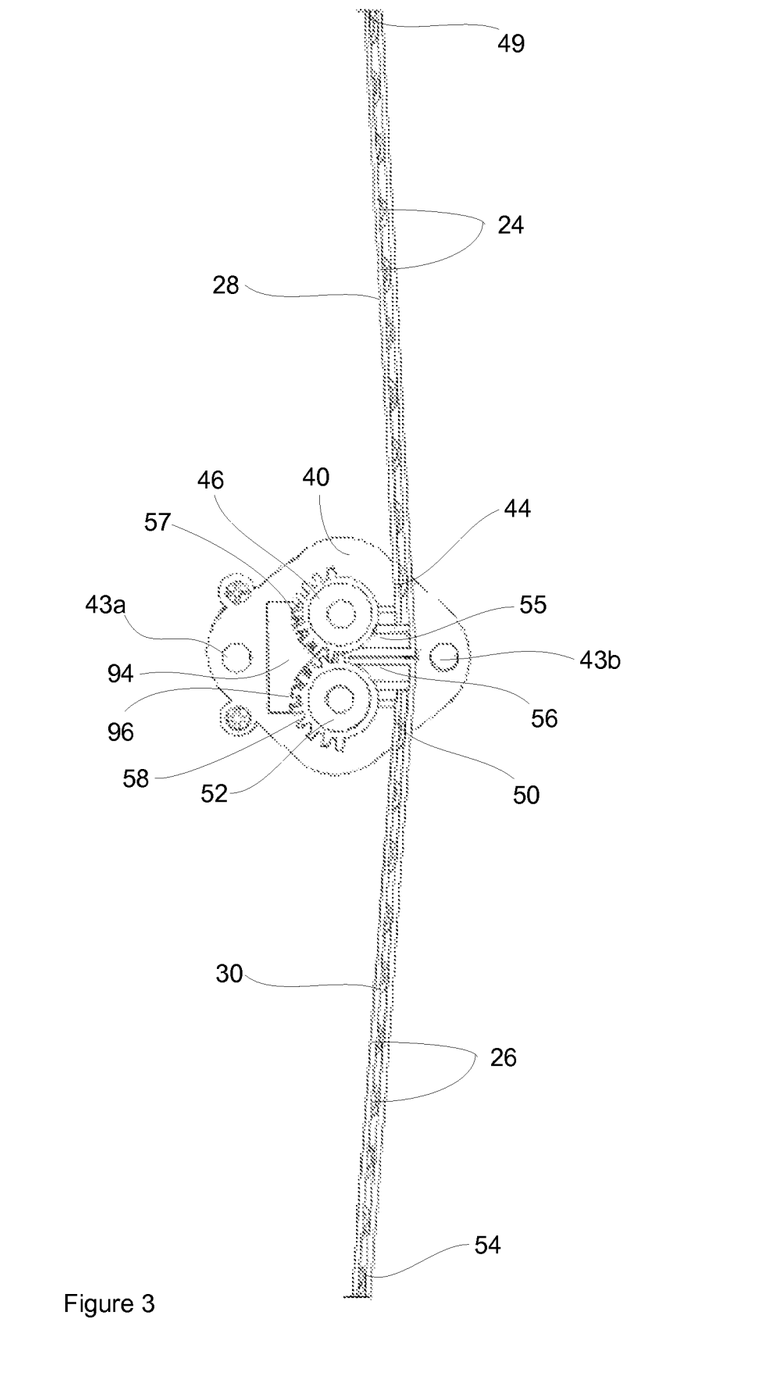
FIG. 3 is a transverse cross section bottom-up view of the rake of FIG. 1 taken along line A-A' showing proximal pivot bracket with partial gear upper pivots, and stop assembly.

As shown in FIGS. 2 and 3, articulating mechanism 27 comprises a pair of rods 36, 38, fixedly attached between upper pivot bracket 40 coupled to lower portion 18 of handle 12 on outer face 41, and a lower pivot bracket 42. The rods 36, 38 are received by guiding sockets 43a, 43b formed with upper pivot bracket 40, and guiding sockets 43c, 43d formed in lower pivot bracket 42. Upper arm 28 comprises a proximal end 44 with a partial gear 46 for rotational movement within socket 47 formed on inner face 48 of bracket 40, and a free distal end 49. Correspondingly, upper arm 30 comprises a proximal end 50 with a partial gear 52 for rotational movement within socket 53 (not shown) in bracket 40, and a free distal end 54. Partial gears 46, 52 are coupled to upper arms 28, 30 via linking arms 55, 56, respectively, and comprise gear teeth 57, 58 that intermesh.

Figure 4:
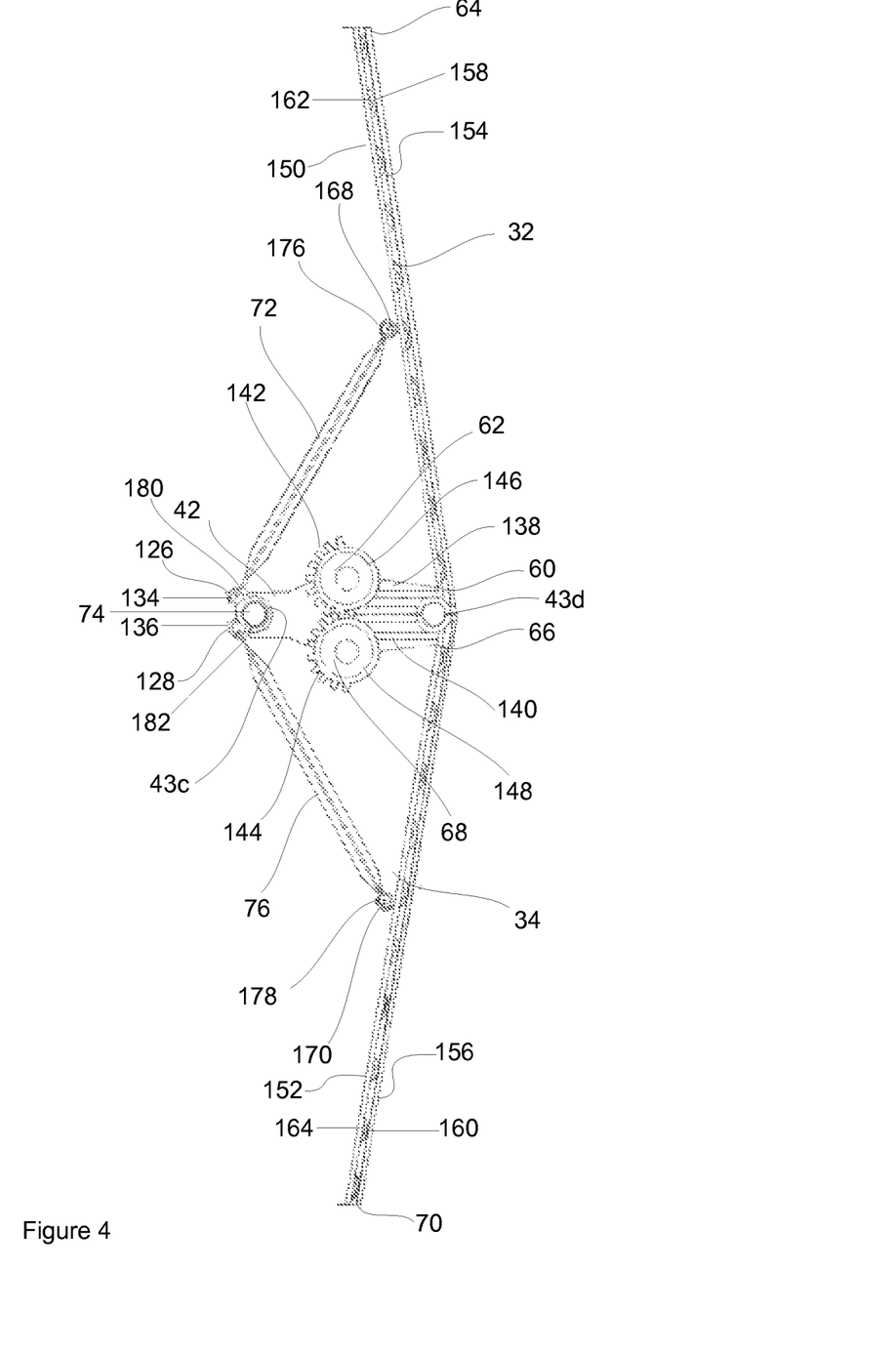
FIG. 4 is a transverse cross section top-bottom view of the rake of FIG. 1 taken along line B-B' showing distal bracket with the partial gear lower pivots, and connector rods.

Now looking at FIG. 4, there is shown lower arms 32, 34 of the articulated frame structure 19. Lower arm 32 comprises a proximal end 60 with a partial gear 62 for rotational movement within socket 63 (not shown) of bracket 42, and a free distal end 64. Correspondingly, lower arm 34 comprises a proximal end 66 with a partial gear 68 for rotational movement within socket 69 (not shown) of the bracket 42, and a free distal end 70. Connector rod 72 is hingedly attached between rod collar 74 slidable on rod 38 and midpoint of lower arm 32, while connector rod 76 is also hingedly attached between rod collar 74 and midpoint of lower arm 34. The sliding motion of rod collar 74 provides a force that causes connector rods 72, 76 to induce rotation of partial gears 62, 68 within sockets 63, 69 of partial gears 62, 68. By virtue of upper arms 28, 30 being part of rake heads 20, 22, upper arms 28, 30 are forced to rotate in sympathy, and partial gears 46, 52 are induced to rotate within sockets 47, 53.

As can be seen in FIGS. 1 and 2, the rest of the articulating mechanism 27 comprises a handle collar 90 slidably attached to handle 12. In operation, handle collar 90 is grasped by a user to provide a longitudinal force to translate the handle collar 90 along handle 12 between lower portion 18 and intermediate portion 16. A pair of connecting members 100, 102 are coupled between handle collar 90 and rod collar 74, such that the sliding motion of handle collar 90 is also translated to rod collar 74 to cause angular motion of connector rods 72, 76 towards bracket 40, thereby forcing rake heads 20, 22 to pivot. Partial gears 46 and 52, including partial gears 62 and 68, co-operate with each other such that rake heads 20, 22 are generally axially aligned corresponding to a raking mode; and also co-operate with each other to pivot rake heads 20, 22 into an angled configuration corresponding to a picking mode to cage the gathered material for pick up and transport.

Also part of the articulating mechanism 27 is a stop mechanism 92, which can be engaged to allow the articulated frame structure 19 to remain rigid and extended open, or disengaged to allow the pair of oppositely disposed rake heads 20, 22 to pivot or rotate when required. The stop mechanism 92 includes a partial gear stop wedge 94 actuable to engage and disengage partial gears 46, 52. Accordingly, partial gear stop wedge 94 comprises a plurality of teeth 96 which intermesh with teeth 57, 58 of partial gears 46, 52 to prevent rotation of partial gears 46, 52.

Now looking again at FIG. 4, bracket 42 is a substantially flat diamond-shaped plate, with guiding sockets 43c, 43d formed therewith adjacent one pair of opposing vertices. As noted above, guiding sockets 43c, 43d receive rods 36 and 38 which are fixedly connected to upper pivot bracket 40. Formed adjacent the other pair of opposing vertices are sockets 63, 69 for rotational mounting of partial gears 62, 68. Rod collar 74 includes a pair of eyelets 126, 128 on opposite sides of outer wall of rod collar 74, and eyelets 126, 128 include apertures 134, 136.

Partial gears 62, 68 are linked to lower arms 32, 34 via linking arms 138, 140, respectively. One half portion of partial gears 62, 68 include gear teeth 142, 144 formed thereon, while toothless half portions 146, 148 of partial gears 62, 68 have linking arms 138, 140 extending therefrom towards inner faces 150, 152 of lower arms 32, 34, respectively. Linking arms 138, 140 join inner faces 150, 152 at an angle less than 90 degrees such that lower arms 32, 34 abut each other at an angle. Tines 24, 26 are secured between inner faces 150, 152 and outer faces 154, 156 of lower arms 32, 34, and tines 24, 26 are arched with apex 158, 160 touching outer faces 154, 156, and intrados 162, 164 facing inner faces 150, 152. About halfway of lower arms 32, 34 are eyelets 168, 170 perpendicular to inner faces 150, 152, with apertures 172, 174 (not shown). Connector rods 72, 76 also include eyelets 176, 178 at one end, and eyelets 180, 182 at another end. Eyelets 176, 178 are received by apertures 172, 174 of eyelets 168, 170 on lower arms 32, 34, while eyelets 180, 182 are received by apertures 134, 136 of eyelets 126, 128 on rod collar 74.

Figure 5A:
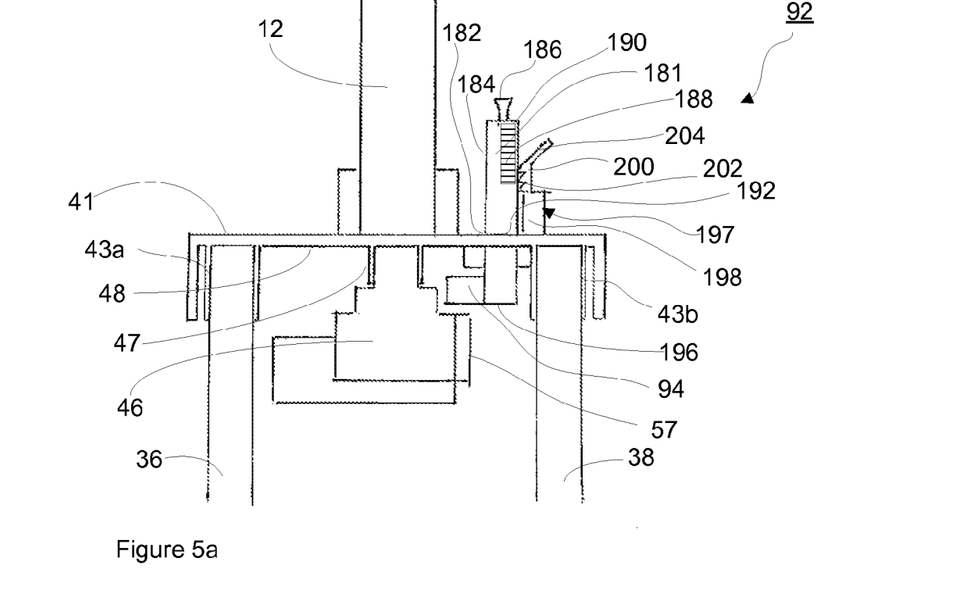
FIG. 5a is a transverse cross section profile view of the rake of FIG. 1 taken along line C-C' showing a stop assembly in a disengaged position.

As shown in FIG. 5a, when stop mechanism 92 is disengaged rake heads 20, 22 are able to pivot or rotate toward each other. Accordingly, sliding handle collar 90 is manually operated by applying an axial force which causes the rake heads 20, 22 to encase the gathered debris in order to grasp and lift the gathered debris, in a transport mode. The force is applied until the debris has been securely grasped between tines 24, 26 of now angled rake heads 20, 22. In more detail, stop mechanism 92 includes pin 181 extending through aperture 182 extending between outer face 41 and inner face 48 of bracket 40, and moveable through aperture 182. Pin 181 includes a rectangular cross section in a plane parallel to handle 12 along the entire length of the pin 181. A frusto-conical handle 186 is connected to a proximal end 190 of pin 181, and receives a force to slide pin 181 through rectangular aperture 182. Upper portion 184 of pin 181 includes a plurality of notches 188 extending from a proximal end 190 of pin 181 to substantially midpoint thereof. Bottom portion 192 of pin 181 appears below inner face 48 distal end 196, and comprise the partial gear stop wedge 94 coupled thereto. Fixedly attached to outer face 41 and adjacent to aperture 182 is an elongate brake actuator 197 operable to lock pin 181 in a particular chosen position. Brake actuator 197 includes an anchor 198 formed with outer face 41, and biased serrated portion 200 with teeth 202 caused to engage notches 188 to arrest sliding motion of pin 181 through aperture 182. Biased serrated portion 200 also includes angled lip 204 for receiving a force to overcome the biasing force and release teeth 202 from notches 188, to permit sliding motion of pin 181.

Figure 5B:
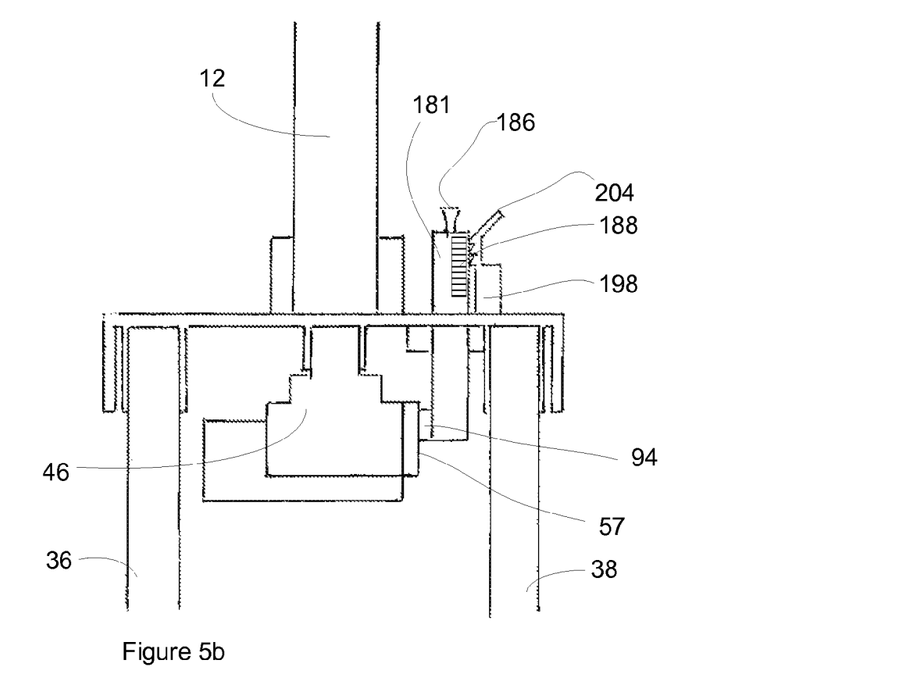
FIG. 5b is a transverse cross section profile view of the rake of FIG. 1 taken along line C-C' showing the stop assembly in an engaged position.

Accordingly, when a downward force is applied to handle 186, proximal end 190 of pin 181 advances towards outer face 41, while distal end 196 and partial gear stop wedge 94 advance away from inner face 48 towards partial gears 46, 52. The force is applied until teeth 96 of partial gear stop wedge 94 engage in intermesh contact with the assembly of teeth 57, 58 of partial gears 46, 52. Biasing force on serrated portion 200 maintains teeth 202 in notches 188, thus allowing teeth 96 of partial gear stop wedge 94 to remain in intermesh engagement with the assembly of teeth 57, 58 of partial gears 46, 52, as shown in FIG. 5b. Accordingly, partial gear stop wedge 94 substantially prevents rotational movements of partial gears 46, 52 within sockets 47, 53. Therefore, when raking mode is desired, stop mechanism 92 may be engaged to allow the articulated frame structure 19 to remain rigid and extended open, with pair of oppositely disposed rake heads 20, 22 at substantially 180 degrees to each other.

For transport mode, stop mechanism 92 is disengaged by applying a force on angled lip 204 of serrated portion 200 to overcome the biasing force and release teeth 202 from notches 188. Concurrently, a pulling force is applied on handle 186 to urge partial gear stop wedge 94 away from partial gears 46, 52 until teeth 96 of partial gear stop wedge 94 are free from intermesh contact with teeth assembly 57, 58 of partial gears 46, 52, such that partial gears 46, 52 are able to freely rotate within sockets 47, 53. Accordingly, rake heads 20, 22 are able to pivot or rotate towards each other to encompass the gathered debris.

A process for transforming rake 10 from a raking mode configuration to a transport mode configuration will now be described. In raking mode configuration as shown in FIGS. 1 and 3, rake heads 20, 22 are generally axially aligned, such that lower arms 32, 34 abut each other at an angle, and likewise upper arms 28, 30 abut each other at an angle. Stop mechanism 92 is engaged to allow the articulated frame structure 19 to remain rigid and extended open while raking material. Handle collar 90 is disposed adjacent to lower portion 18 of handle 12, with connector rods 72, 76 being substantially parallel to bottom bracket 42. Partial gear 46 coupled to upper arm 28 and partial gear 52 of upper arm 30 comprise gear teeth 57, 58 that intermesh, as shown in FIG. 3; and toothless half portions 146, 148 of partial gears 62, 68 face inner faces 150, 152 of lower arms 32, 34, while a majority of gear teeth 142, 144 face partial gear stop wedge 94.

When raked material has been placed in a pile and ready for transport, stop mechanism 92 is disengaged and sliding handle collar 90 is manually operated. Handle collar 90 is grasped by a user's hand and a force is applied to displace handle collar 90 away from lower portion 18 of handle 12 towards intermediate portion 16, and that longitudinal force is translated to rod collar 74 to cause angular motion of connector rods 72, 76 towards upper bracket 40. As connector rods 72, 76 are hingedly connected between rod collar 74 and midpoint of lower arms 32, 34, the applied force pulls on lower arms 32, 34 such that gear teeth 142, 144 intermesh and partial gear 62 rotates in an anti-clockwise fashion, while partial gear 68 rotates in an clockwise fashion. The rotating partial gears 62, 68 allow rake heads 20, 22 to rotate in step with one another. Partial gears 62, 68 continue to rotate in sockets 63, 69, and by virtue of upper arms 28, 30 being part of rake heads 20, 22, the upper arms 28, 30 are forced to rotate in sympathy, and partial gears 46, 52 are induced to rotate within sockets 47, 53.

Figure 6:
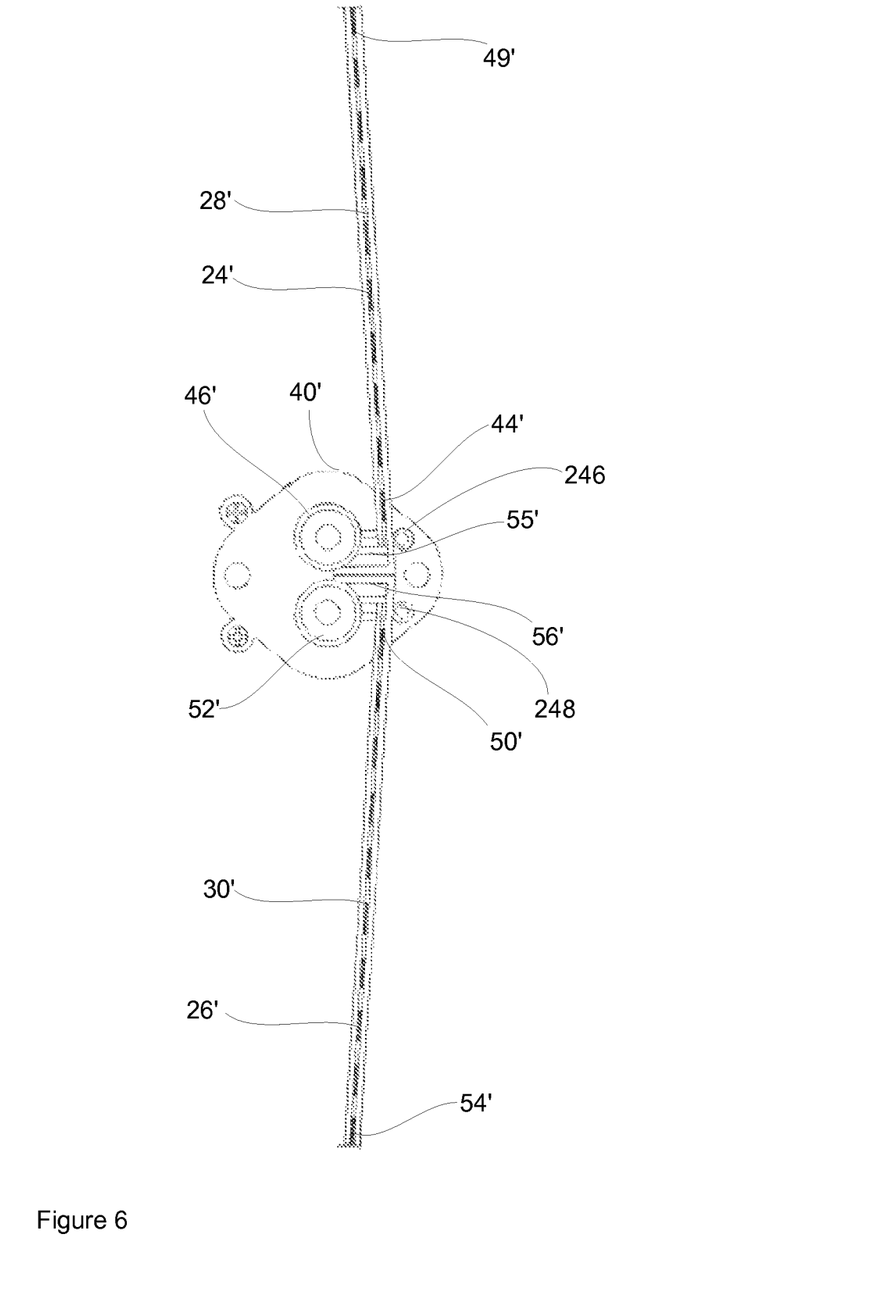
FIG. 6 is a traverse section of the rake of FIG. 1 taken along line A-A' showing a bottom up view of the proximal bracket with modified upper pivots, right and left proximal traverse upper arms with modified flat tines and female right and left cylindrical receptors of a modified stop mechanism, in another embodiment.

In another exemplary embodiment, as shown in FIG. 6, there is shown a bottom up view of the proximal bracket 40' with upper arm 28' and upper arm 30' hingedly coupled thereto, with a modified stop mechanism 210, of a rake 10' (not shown). Similar to rake 10, rake 10' comprises an elongate handle 12' coupled to an articulated frame structure 19' (not shown) comprising a pair of oppositely disposed rake heads 20', 22' (not shown) having a plurality of tines 24', 26', secured to upper arms 28', 30' and lower arms 32', 34'. Upper arm 28' comprises a proximal end 44' with a pivot disc 46' for independent rotational movement within socket 47' formed on inner face 48' of bracket 40', and a free distal end 49'. Correspondingly upper arm 30' comprises a proximal end 50' with a pivot disc 52' for independent rotational movement within socket 53' (not shown) in bracket 40', and a free distal end 54'. Pivot discs 46', 53' are coupled to upper arms 28', 30' via linking arms 55', 56'.

Figure 7:
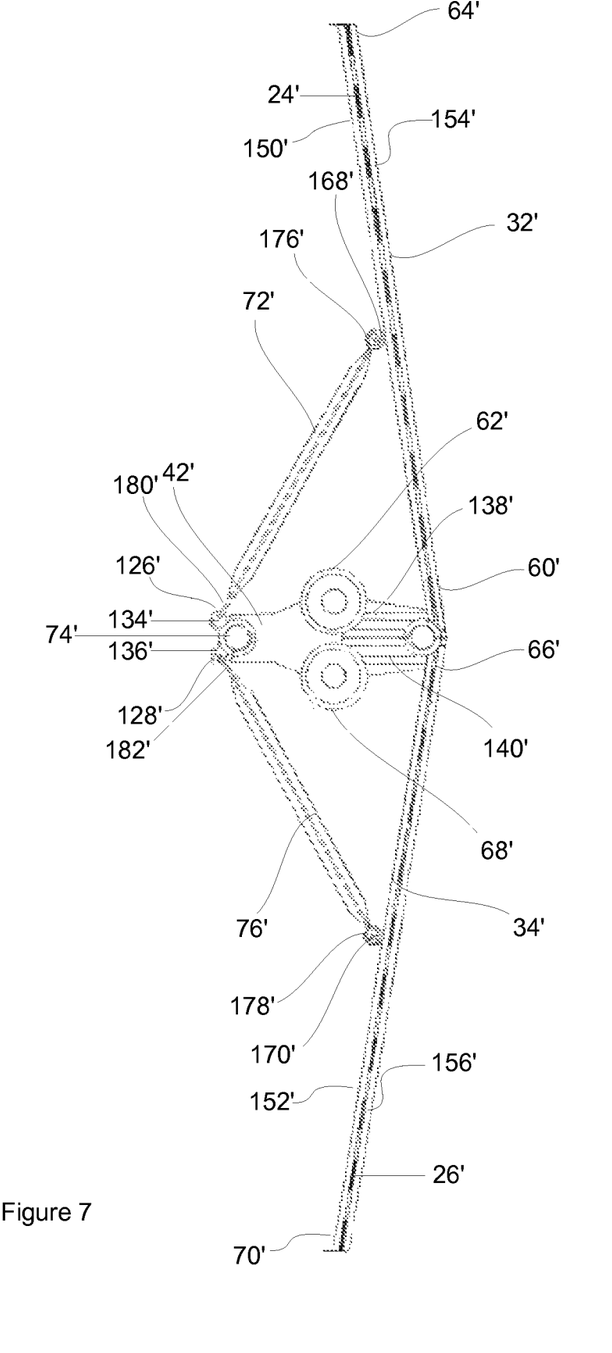
FIG. 7 is a traverse section of the rake of FIG. 1 taken along line B-B' showing top-bottom view of the distal bracket showing the modified lower pivots, right and left distal traverse lower arms with modified flat tines, in another embodiment.

Now looking at FIG. 7, lower arm 32' comprises a proximal end 60' with a pivot disc 62' for independent rotational movement within socket 63' (not shown) of bracket 42', and a free distal end 64'. Correspondingly lower arm 34' comprises a proximal end 66' with a pivot disc 68' for independent rotational movement within socket 69' (not shown) of the bracket 42,' and a free distal end 70'. A connector rod 72' is hingedly attached between a rod collar 74' slidable on rod 38 and midpoint of lower arm 32', while connector rod 76' is also hingedly attached between rod collar 74' and midpoint of lower arm 34'. The sliding motion of rod collar 74' provides a force that causes connector rods 72', 76' to induce the rotation of pivot discs 62', 68' about sockets 63', 69' (not shown). By virtue of upper arms 28', 30' being part of rake heads 20, 22, the upper arms 28', 30' are forced to rotate in sympathy, and partial gears 46', 52' are induced to rotate within sockets 47', 53'.

Similar to bracket 42 of FIG. 4, bracket 42' is a substantially flat diamond-shaped plate, with guiding sockets 43c', 43d' formed therewith adjacent one pair of opposing vertices. As noted above, guiding sockets 43c', 43d' receive rods 36' and 38' which are fixedly connected to upper pivot bracket 40'. Formed adjacent the other pair of opposing vertices are sockets 63', 69' for rotational mounting of partial gears 62', 68'. Rod collar 74' includes a pair of eyelets 126', 128' with apertures 134', 136', and disposed on opposite sides of outer wall of rod collar 74'. Pivot discs 62', 68' are linked to lower arms 32', 34' via linking arms 138', 140', respectively. Linking arms 138', 140' extend from pivot discs 62', 68' to inner faces 150', 152' of lower arms 32', 34', respectively, at an angle less than 90 degrees such that lower arms 32', 34' abut each other at an angle. Tines 24', 26' are equally spaced and secured between inner faces 150', 152' and outer faces 154', 156' of lower arms 32', 34', and have a flat cross section. About halfway of lower arms 32', 34' are eyelets 168', 170' perpendicular to inner faces 150', 152', with apertures 172', 174'. Connector rods 72', 76' also include eyelets 176', 178' at one end, and eyelets 180', 182' at another end. Eyelets 176', 178' are received by apertures 172', 174' of eyelets 168', 170' on lower arms 32', 34', while eyelets 180', 182' are received by apertures 134', 136' of eyelets 126', 128' on rod collar 74'.

Figures 8A, 8B, 8C:
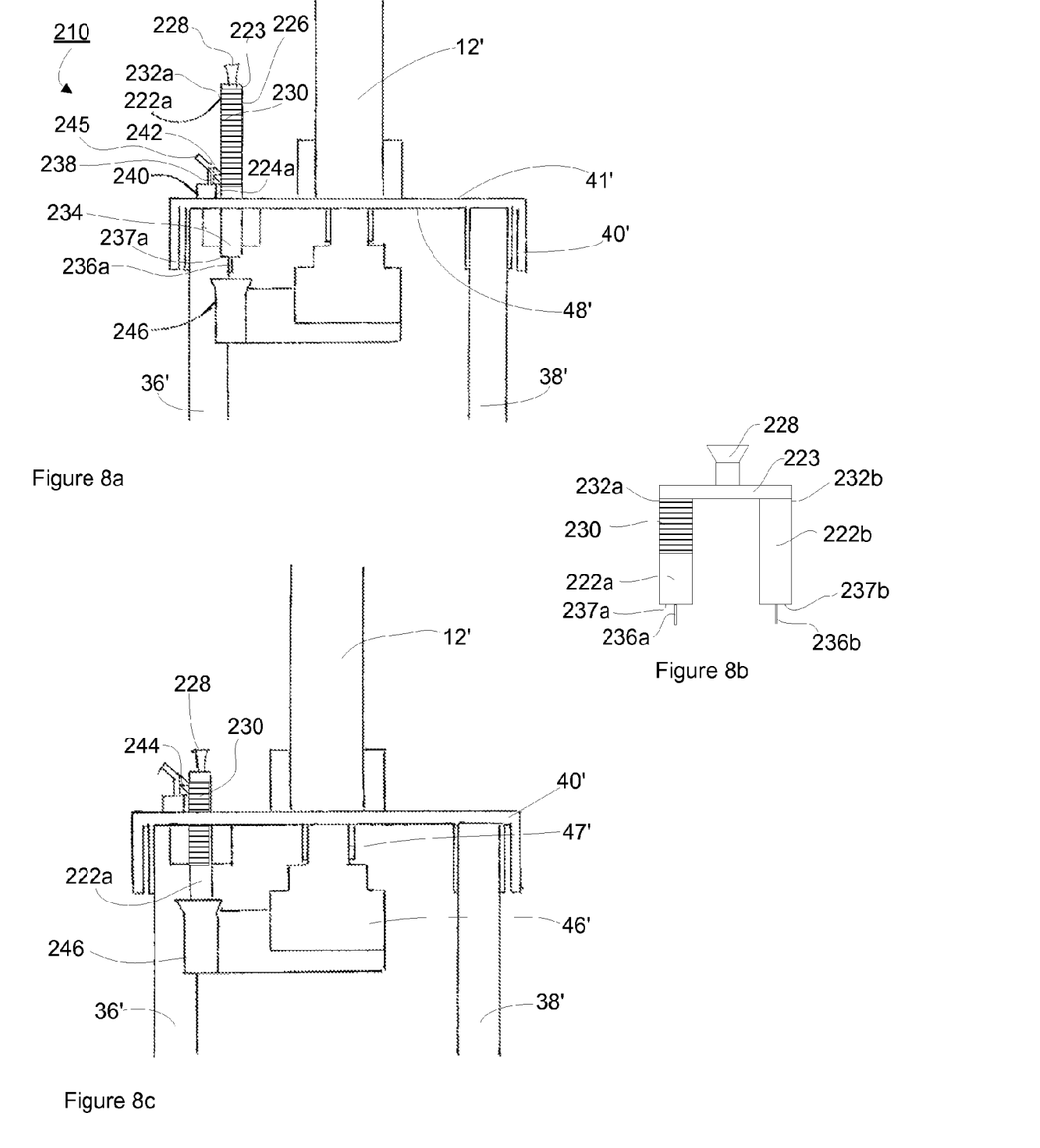
FIG. 8a is transverse cross section profile view of the rake of FIG. 1 taken along line C-C' showing a stop assembly in a disengaged position, in another embodiment.
FIG. 8b is a transverse cross section profile view of the stop assembly of the rake of FIG. 1 taken along line A-A', in another embodiment.
FIG. 8c is transverse cross section profile view of the rake of FIG. 1 taken along line C-C' showing the stop assembly in an engaged position, in another embodiment.

Similar to stop mechanism 92, stop mechanism 210 can be engaged to allow the articulated frame structure 19' (not shown) to remain rigid and extended open or disengaged to allow the pair of oppositely disposed rake heads 20', 22' (not shown) to pivot or rotate when required, as shown in FIGS. 8a, 8b and 8c. When stop mechanism 210 is disengaged and sliding handle collar 90' (not shown) is manually operated, then rake 10' (not shown) is now configured to pivot or rotate to encase the gathered debris in order to provide for lifting the gathered debris, in a transport mode.

As shown in more detail in FIG. 8b, stop mechanism 210 includes pins 222a, 222b coupled to each other by a connecting member 223. Pins 222a, 222b are moveable through apertures 224a, 224b (not shown) extending between outer face 41' and inner face 48' of bracket 40', as shown in FIG. 8a. A frusto-conical handle 228 connected about midpoint of connecting member 223, and receives a force to slide pins 222a, 222b through aperture 224a, 224b. An upper portion 226 of pins 222a, 222b appears above outer face 41', and upper portion 226 of pin 222a includes a plurality of notches 230 extending from a proximal end 232a of pin 222a to substantially midpoint thereof. Bottom portion 234 of pins 222a, 222b appears below inner face 48' and includes guides 236a, 236b at distal ends 237a, 237b. Fixedly attached to outer face 41' and adjacent to aperture 224a is an elongate brake actuator 238 operable to lock pins 222a, 222b in a particular chosen position. Brake actuator 238 includes an anchor 240 formed with outer face 41', and biased serrated portion 242 with teeth 244 caused to engage notches 230 to arrest sliding motion of pin 222a through aperture 224a, and hence that of pin 222b through aperture 224b. Biased serrated portion 242 also includes angled lip 245 for receiving a force to overcome the biasing force and release teeth 244 from notches 230 thus allowing sliding motion of pin 222a, and hence also allows sliding motion of pin 222b.

As described above, upper arm 28' comprises a proximal end 44' with a pivot disc 46' for rotational movement within socket 47' formed on inner face 48' of bracket 40', and a free distal end 49', and correspondingly upper arm 30' comprises a proximal end 50' with a pivot disc 52' for rotational movement within socket 53' (not shown) in bracket 40', and a free distal end 54'. Formed within linking arm 55' is a female receptacle 246 dimensioned to receive pin 222a. Correspondingly formed within linking arm 56' is a female receptacle 248 dimensioned to receive pin 222b. Accordingly, with female receptacles 246, 248 aligned with pins 222a, 222b, a pushing force is applied to handle 228, and proximal ends 232a, 232b of pins 222a, 222b advance towards outer face 41', while distal ends 237a, 237b and guides 236a, 236b advance away from inner face 48' towards female receptacles 246, 248. The force is applied until a portion of pin 222a, 222b occupies most of female receptacles 246, 248 and remains anchored in both female receptacles 246, 248, thus preventing rotational movement of pivot discs 46', 52' within sockets 47', 53'.

For transport mode, stop mechanism 210 is disengaged by applying a force on angled lip 245 of serrated portion 242 to overcome the biasing force and release teeth 244 from notches 230. Concurrently, a pulling force is applied on handle 228 to urge the portion of pins 222a, 222b out of female receptacles 246, 248, until distal ends 237a, 237b of pins 222a, 222b are free of female receptacles 246, 248, such that pivot discs 46', 52' are able to freely rotate within sockets 47', 53'.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Thus, the preceding detailed description is presented for purposes of illustration only and not of limitation, and the scope of the invention is defined by the preceding description, and with respect to the attached claims.

The embodiments of the invention in which an exclusive property or privilege is claimed are defined as follows:

1. A rake comprising:
    a handle with an upper portion, an intermediate portion and a lower portion;
    a pair of oppositely disposed frames pivotally attached to said lower portion, said pair of oppositely disposed frames having a plurality of tines;
    an articulating mechanism comprising:
        a pair of brackets fixedly coupled to said lower portion;
        a pair of rods fixedly coupled between said pair of brackets;
        a handle collar slidable on said handle, said handle collar coupled to a rod collar by a pair of connecting members, said rod collar slidable on one of said pair of rods;
        a pair of connector rods hingedly coupled between said rod collar and said pair of oppositely disposed frames;
    wherein said pair of rods are attached between an upper pivot bracket coupled to said lower portion of said handle, and a lower pivot bracket;
    wherein each of said frames comprises an upper arm and a lower arm, having said plurality of tines secured thereto;
    wherein said pair of rods are axially aligned with said handle, wherein said rods are parallel to each other and fulfill the dual function as an extension to the handle and as a guide for the slidable rod collar, allowing for the functioning of the articulating mechanism;
    wherein said upper arm is pivotally connected to said upper pivot bracket and said lower arm is pivotally connected to said lower pivot bracket;
    wherein said upper arm is coupled to an upper pivoted disc rotatably mounted on said upper pivot bracket and said lower arm is coupled to a lower pivoted disc rotatably mounted on said lower pivot bracket; and
    whereby sliding said handle collar causes said rod collar to slide in a synchronized way and provides a force to said pair of connector rods to pivot said pair of oppositely disposed frames towards one other or away from one another.

2. The rake of claim 1, wherein said lower arm is hingedly coupled to one end of said pair of connector rods, and the other end of said connector rod is hingedly coupled to said rod collar slidable on one said pair of rods.

3. The rake of claim 2, wherein said pair of connecting members is coupled on one end to said rod collar and on the other end to said handle collar.

4. The rake of claim 3, wherein an upward sliding movement of said handle collar causes the upward movement of said pair of connecting members, which causes upward sliding movement of said rod collar which causes said connector rods to pull said lower arms which rotate on said pivoted discs to move said pair of oppositely disposed frames toward each other, enclosing material for lifting and disposing said material.

5. The rake of claim 4, wherein said upper pivot bracket comprises a stop mechanism to maintain pair of oppositely disposed frames in said substantially axially aligned position.

6. The rake of claim 1, wherein a portion of each of said pivoted discs comprises gears with teeth that intermesh for mutual rotation of said upper arms and lower arms of said pair of frames.

7. The rake of claim 6, wherein said pair of fixed rods are axially aligned and off centre with said handle providing an advantageous forward position to provide a lever effect over said pair of lower arms and facilitate the swivelling of said connector rods.

8. The rake of claim 7, wherein mid-points of said pair of lower arms are hingedly coupled to one end of said pair of connector rods by eyelets and the other end of said pair of connector rods are hingedly coupled to said rod collar by eyelets, said rod collar slidable on one said pair of fixed rods.

9. The rake of claim 8, wherein said pair of connector rods are in a horizontal front to back angled position from said rod collar to mid-point of said lower arms when in an open raking mode for gathering debris, wherein said connector rods swivel as said rod collar slides upwardly to a final substantially vertical back to front angled position from said rod collar when in a pick-up mode enclosing said debris.

10. The rake of claim 9, wherein an upward sliding movement of said handle collar causes an upward movement of said connecting members, said connecting members rigid in nature, which causes upward sliding movement of said rod collar which forces said connector rods to swivel from an initial horizontal position to a substantially vertical final position pulling said lower arms which rotate on said pivoted discs in a synchronized way with upper arms which also rotate on said pivoted discs, to move said pair of oppositely disposed frames towards each other.

11. The rake of claim 9, wherein a downward sliding movement of said handle collar causes a downward movement of said connecting members, said connecting members rigid in nature, which causes downward sliding movement of said rod collar which forces said connector rods to swivel from an initial substantially vertical position to a final horizontal position pushing open said lower arms which rotate on said pivoted discs in a synchronized way with upper arms which also rotate on said pivoted discs, to move said pair of oppositely disposed frames away from one other.

* * * * *